INVENTORS
DONALD K. CAPALITE
HAROLD M. SLAMA
By N. Robert Henderson
ATTORNEY

April 29, 1969  H. M. SLAMA ETAL  3,440,754
FISHING ROD ALARM SYSTEM
Filed July 18, 1966  Sheet 2 of 2
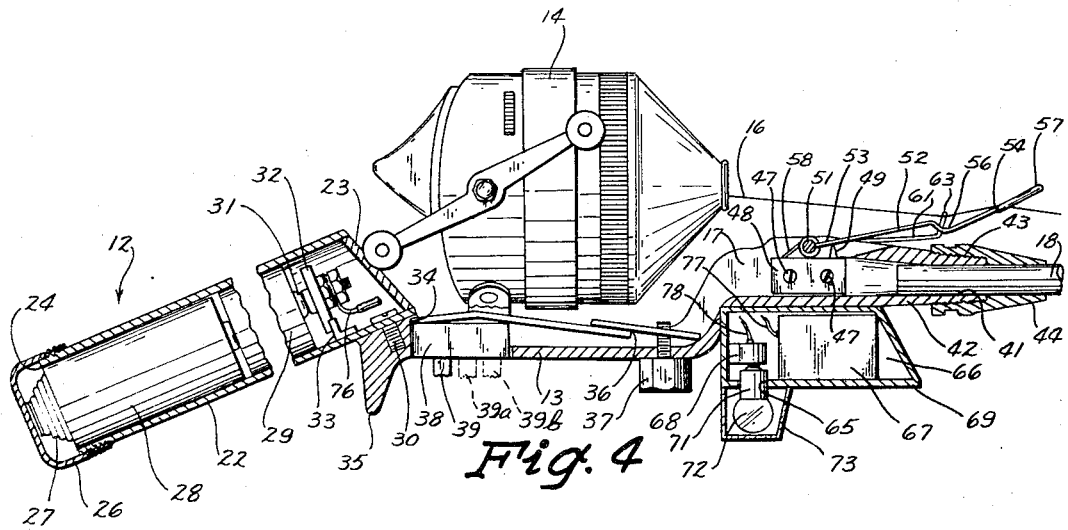
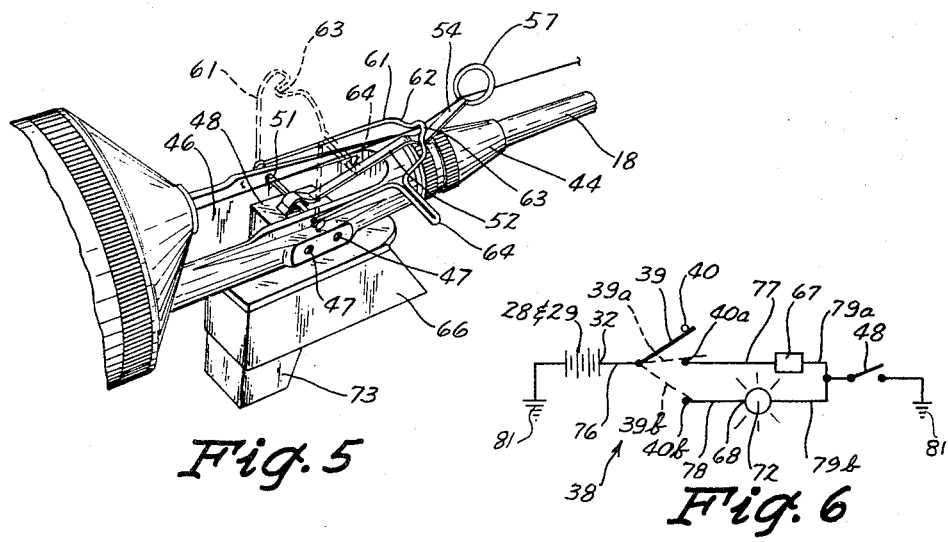
INVENTORS
DONALD K. CAPALITE
HAROLD M. SLAMA
BY
Robert Henderson
ATTORNEY

# United States Patent Office 3,440,754
Patented Apr. 29, 1969

3,440,754
FISHING ROD ALARM SYSTEM
Harold M. Slama, 3919 N. 11th St., Carter Lake, Iowa,
and Donald K. Capalite, 3135 Westside Drive, Council
Bluffs, Iowa 51501
Filed July 18, 1966, Ser. No. 566,110
Int. Cl. A01k 97/12
U.S. Cl. 43—17
8 Claims

ABSTRACT OF THE DISCLOSURE

An alarm system for a fishing rod which comprises a lever provided with an eye at a free end and mounted at its other end on the rod handle together with a U-shaped tensioning element also mounted on the rod handle and in a straddling position over the lever. The tensioning element is movable to a first position away from the lever and to a second position in engagement with the fishing line and closely adjacent the lever. The fishing line extends through both the tensioning element and the lever eye in substantially non-contacting relation therewith when the tensioning element is in the first position, whereby the line can be cast without restriction from the tensioning element or the lever. After casting, the tensioning element is moved to the second position whereby a pull on the line will cause the lever to activate the signal unit. The tensioning element is movable to a plurality of positions thus permitting the fisherman to regulate the sensitivity of the alarm system.

---

This invention relates generally to a fishing rod and more particularly to a fishing rod alarm system for emitting a signal when a fish strikes the bait.

Many alarm systems have been developed and are available to alert the fisherman when a fish strikes his line. These systems utilize lights which flash or buzzers which ring when a fish strikes; however, all of them are set after the line has been cast or placed in the water. Putting it another way, the line is first cast, and then the fisherman manually grasps the line to connect it to the alarm system.

As many fishermen enjoy fishing at night, obviously it is very difficult if not impossible to connect the line to the alarm system. Furthermore, during cold weather, when fingers are stiff or when gloves are worn, setting the commercially available alarm system can be most difficult, with the result that often times the alarm system is not utilized.

It is therefore, an object of this invention to provide a fishing rod alarm system wherein the line is always connected to and in engagement therewith thus negating the requirement of physically grasping the line to set the alarm system every time a cast is made.

Another object of this invention is the provision of a fishing rod alarm system wherein the line can be cast while in engagement with the alarm system.

A further object of this invention is to provide a fishing rod alarm system wherein the amount of tension required to activate the alarm is adjustable and compensation can be made for fishing in a strong current or where live bait is used, thus obviating the possibility of a false alarm.

A further object of this invention is the provision of a fishing rod alarm system which is substantially built into the rod handle.

Yet another object of this invention is the provision of a fishing rod alarm system wherein the sensitivity thereof to a pull on the line is adjustable.

A still further object of this invention is to provide a fishing rod alarm system which utilizes a double warning alarm and therefore can be used at night wherein a light is energized or during the day when an annunciator is energized as a fish strikes the line.

Another object of this invention is the provision of a fishing rod alarm system wherein the electrical components thereof are maintained in a water tight condition.

A still further object of this invention is the provision of a fishing rod alarm system utilizing a switching arrangement which can either allow the signal to emit in the form of light or sound, or when desired to deactivate the system.

Yet another object of this invention is to provide a fishing rod alarm system which is economical to manufacture, extremely functional in use, and simple and rugged in construction.

These objects, and other features and advantages of this invention will become more readily apparent upon reference to the following description, when taken in conjunction with the accompanying drawings, wherein:

FIG. 4 is an enlarged sectional view taken along the line 4—4 in FIG. 3, excepting the conventional reel;

FIG. 5 is an enlarged, fragmentary perspective detail view, certain parts shown in alternate positions by the use of full and dotted lines;

FIG. 6 is a schematic wiring diagram of the electrical circuitry.

Figure 1:
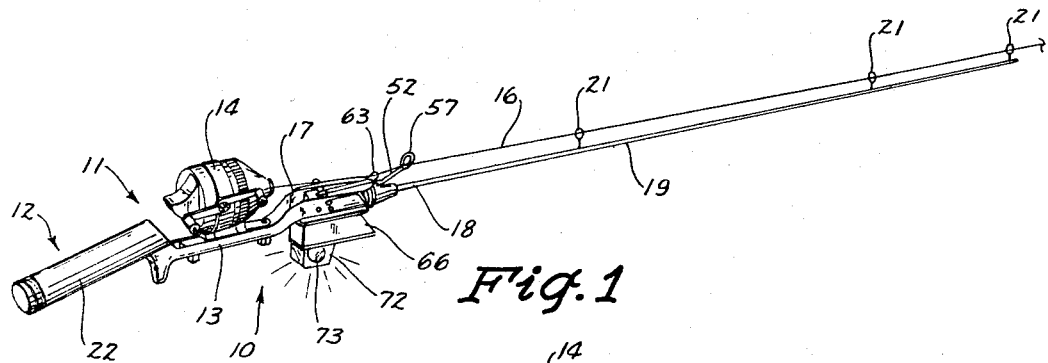
FIG. 1 is a perspective view showing the fishing rod alarm system of this invention.

Referring now to the drawings, the fishing rod alarm system of this invention is shown generally at 10 in FIG. 1 as a substantially integral part of a fishing rod handle 11. The handle 11 (FIG. 2) has a rear gripping portion 12, an intermediate portion 13 adapted to hold a conventional reel 14 with a line 16 attached thereto, and a forward portion 17 adapted to hold the end 18 of a fishing rod 19 (FIG. 1). The rod 19 has a plurality of longitudinally spaced and aligned eyes 21 mounted thereon through which the line 16 is disposed.

The rear portion 12 (FIG. 4) comprises an elongated tubular housing 22, having the forward end 23 closed and open at the opposite end 24 thereto. The outer surface of the housing 22, at the opposite end 24 has threads formed thereon for threadably receiving a threaded cap 26, thus providing a water tight cavity in the housing 22. Mounted within the cap is a coiled spring 27, the purpose thereof to be described hereinafter.

A pair of battery cells 28 and 29 (FIG. 4) are disposed in end-to-end relation within the cavity. The terminal 31 of the forward battery 29 contacts a contact plate 32 secured to the inner wall of the housing by a non-conductive bracket 33. The spring 27, acting as a ground, also maintains electrical contact between the batteries 28 and 29 and the plate 32.

Secured to the rear portion 12 (FIG. 4), by a screw 30, is the intermediate portion 13 having a finger grip 35, depending therefrom, to facilitate convenient handling of the handle and rod. The intermediate portion 13 has a recess 34 formed in the rear end thereof and a clamp 36 secured thereto by a bolt 37 for holding the reel 14 in a conventional manner. A three-way switch 38, having a slideable bolt 39 depending therefrom, is mounted on the intermediate portion adjacent the recess 34. The purpose and action of the switch 38 will be described hereinafter.

The forward portion 17 (FIG. 4) of the handle 11, integral with the intermediate portion 13, has a hole 41 formed in the forward end 42 for receiving the end 18 of the rod 19. External threads 43 are formed on the forward end 42 for receiving an internally threaded chuck 44 which holds the rod end 18 securely to the forward end 42.

A cavity 46 is formed in the forward portion 17 intermediate the ends thereof, as best illustrated in FIG. 5. Mounted in the cavity 46, and held therein by a pair of screws 47 secured to the forward portion 17, is a normally open microswitch 48 having an upstanding plunger 49 (FIG. 4) slideably mounted therein. The plunger is biased in an upstanding position and upon retracting the plunger 49 the switch 48 is closed. A pin 51, disposed above the switch 48 and laterally spanning the cavity 46, is mounted on both ends thereof to the walls of the forward portion 17, as best noted in FIG. 5.

A lever 52 (FIG. 4), mounted in engagement with the plunger 49 and operable to retract, that is, push the plunger down, has one end 53 pivotally mounted on the pin 51 with the other end 54 extending forwardly from the forward portion 17. An offset bend 56 is formed intermediate the ends of the lever 52; and an eye 57, adapted to slideably receive the line 16, is formed on the other end 54. Extending downwardly and rearwardly from the one end 53 and engageable on the outer end thereof with the top surface of the micro-switch 48, is an arm 58 which functions as a stop to limit the pivotal movement of the lever 52, thus holding the lever 52 in engagement with the plunger 49.

Pivotally mounted on the pin 51 (FIG. 5) is a U-shaped tensioning element 61, wherein the open ends are rotatably secured to the pin 51 and the closed end 62 projects upwardly between the reel 14 and the eye 57, with the line 16 disposed between the forward portion 17 and the closed end 62. The closed end 62 has a U-shaped offset 63 formed therein, as best noted in FIG. 5. Mounted on one side of the element 61 is an outwardly projecting finger gripping lug 64.

Secured to the forward portion 17 and depending therefrom is a signal housing 66, as shown in FIG. 4. Mounted within the housing 66, at its forward end, is an annunciator 67, and on the opposite end is mounted an electrical contact unit 68. An opening 65 is formed in the bottom wall 69 of the housing 66, below the contact unit 68, adapted to receive the plug end 71 of a light bulb 72, wherein the plug end 71 electrically contacts the unit 68. A transparent housing 73 is removably secured to the bottom wall 69 and cover the bulb 72.

As best shown in FIGS. 4 and 6, the contact plate 32 is wired to a three-way switch 38 by a wire 76 mounted in a suitable passage between the cavity and the switch. The switch 38 has three poles; the first 40 breaking the circuit, the second 40a is wired to the annunciator 67 by a wire 77 and the third 40b is wired to the contact unit 68 of the bulb 72 by a wire 78. The wires 77 and 78 are mounted in suitable passages leading from the switch 38 to the signal housing 66. The annunciator 67 and the bulb 72 are wired in parallel to the micro-switch 48 by a pair of wires 79a and 79b. The micro-switch 68 is grounded to the forward portion 17.

In operation, the line 16 (FIG. 2) is threaded between the tensioning element 61 and the forward portion 17, through the lever eye 57 and the rod eyes 21 (FIG. 1) and attached to a lure (not shown). With the tensioning element pivoted to a stationary, upright position, as shown in dotted lines in FIG. 2, the line 16 can be cast from the reel 14. It will be noted that both the element 61 and the eye 57 are in substantially non-contacting relation with the line 16, and neither will offer resistance to the line as it is cast.

Figure 2:
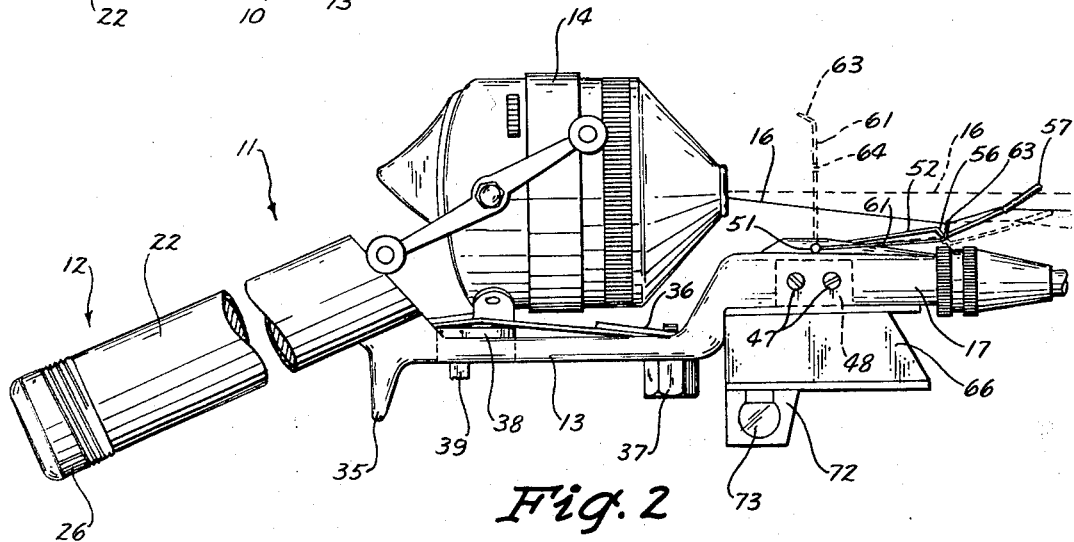
FIG. 2 is an enlarged side elevational fragmentary view of the handle end of the rod.
Figure 3:
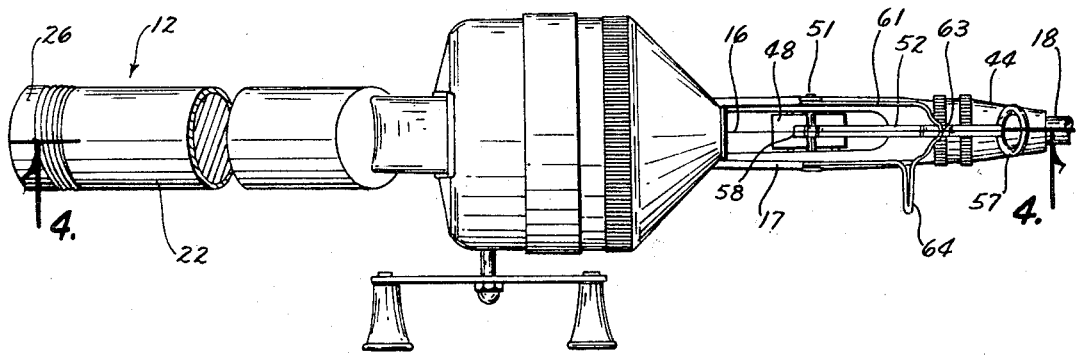
FIG. 3 is an enlarged top plan view of the structure of FIG. 2.

Upon the completion of the cast, the element 61 is grasped by the fingers at the lug 64 and pivoted to a second position, shown in full lines in FIG. 2, with the offset 63 in engagement with the line 16. The element 61 causes the line to be deviated from a straight line path, as shown in dotted lines in side elevation in FIG. 2, to a V-shaped path shown in full lines, between the reel 14 and the eye 57, with the line 16 in engagement with the eye 57. The bolt 39 of the switch 38 is moved forward to a first position 39a, shown in dotted line in FIG. 4, wherein the annunciator 67 is wired to the batteries 28 and 29, or to a second position 39b, wherein the bulb 72 is wired to the batteries.

A pull on the lure, as by the strike of a fish, will tend to cause the line 16 to attain its straight, dotted line position of FIG. 2. The element 61, however, prevents movement of the line 16; resulting instead in the lever 52 being pulled downwardly by the line 16 to a second position, shown in dotted lines in FIG. 2. This causes the plunger 49 (FIG. 4) to retract and the circuit between the contact 68 or the annunciator 67 and the ground 81 to be closed. The closing of the micro-switch will allow either the light to flash or the annunciator to sound depending on the positioning of the switch bolt 39, thus warning the fisherman of the action on his line.

Neither the element 61 or the eye 57 will prevent the setting of the hook in the mouth of the fish or the reeling in of the line.

The amount of pull required to pivot the lever 52 to its second position can be regulated by properly positioning the element 61. When the line 16 is slightly deviated from its straight line path by the element 61, a greater pull is required to retract the plunger 49 and thus to energize the circuit. As the V-path, in side elevation (FIG. 2), becomes more pronounced a lesser pull is required to energize the circuit, thus compensation can be made if fishing in a current or when using live bait.

Although a preferred embodiment of this invention has been described and disclosed hereinbefore, it is to be remembered that various modifications and alternate constructions can be made thereto without departing from the true spirit and scope of the invention.

We claim:

1. A fishing rod alarm system comprising:
a fishing rod handle having a rear gripping portion, an intermediate portion adapted to hold a conventional reel with a line attached thereto, and a forward portion adapted to hold the end of a fishing rod;
signal means mounted on said handle;
lever means mounted on said handle and operably connected to said signal means, said lever means movable from a first position wherein said signal means is non-energized to a second position wherein said signal means is energized, said line threaded through an eye on the free end of said lever means in said first position in substantially non-contacting relation therewith and engageable with said lever means in said second position; and
tensioning means movably mounted on said handle, said tensioning means movable from a nonengaging position with said line to an engaging position with said line, wherein said line is deviated from a straight line path to a V-shaped path;
said lever means movable to said second position, when said tensioning means is in said engaging position, in response to a pull on said line which tends to cause said line to attain said straight line path.

2. A fishing rod alarm system as defined in claim 1, and further wherein said lever means includes an elongated member having one end thereof pivotally mounted on said forward portion and having the free end thereof extending forwardly from said forward portion, wherein said line in said straight line path extends from said reel through said eye, thus allowing said line to be cast from said reel through said eye.

3. A fishing rod alarm system as defined in claim 2, and further wherein said tensioning means is adapted to be engaged and moved by the fingers, and is pivotally mounted at one end thereof on said forward portion with the other end thereof disposed between said reel and said eye.

4. A fishing rod alarm system as defined in claim 3, and further wherein said tensioning means comprises a substantially U-shaped element having the open ends thereof pivotally mounted on said forward portion and the closed end thereof projecting upwardly therefrom, said line disposed between said closed end and said forward position.

5. A fishing rod alarm system as defined in claim 4, wherein said tensioning means is movable to a plurality of said engaging positions, thus requiring different degrees of pull on said line to move said lever means.

6. A fishing rod alarm system as defined in claim 5, and further wherein said signal means includes a signal element, a source of power, an electrical circuit connecting said element to said power source, and a normally open switch interposed in said circuit, said lever means operable in said second position to close the circuit and energize the signal element.

7. A fishing rod alarm system as defined in claim 6, and further wherein said element includes a lamp, an annunciator, and a second switch interposed in said circuit, said second switch manually movable to a second position to electrically connect said lamp with said power source and to a third position to electrically connect said annunciator with said power source.

8. A fishing rod alarm system as defined in claim 7, and further wherein said rear portion is formed from an elongated tubular housing having one end closed and its opposite end open, said power source comprising at least one battery, said housing adapted to receive said batteries therein, and further including a cap detachably mounted on said housing over said open end for holding said batteries therein.

References Cited

UNITED STATES PATENTS

| | | | |
|---|---|---|---|
| 2,409,988 | 10/1946 | Schwebs | 43—17 |
| 2,814,900 | 12/1957 | Frazier | 43—17 |
| 3,091,881 | 6/1963 | Evans | 43—17 |

SAMUEL KOREN, *Primary Examiner.*

D. J. LEACH, *Assistant Examiner.*